Jan. 12, 1954  R. H. SHEPPARD  2,665,675
VALVE SEAT INSERT
Filed March 31, 1952

INVENTOR
RICHARD H. SHEPPARD,
BY Henry H. Snelling
ATTORNEY

Patented Jan. 12, 1954

2,665,675

UNITED STATES PATENT OFFICE 2,665,675

VALVE SEAT INSERT

Richard H. Sheppard, Hanover, Pa.

Application March 31, 1952, Serial No. 279,592

8 Claims. (Cl. 123—188)

This invention relates to valve seats in internal combustion engines and has for its principal object the provision of a valve seat insert that will be particularly effective in engines of high output per cubic inch of piston displacement, where the valve or the engine block or both become distorted because of uneven expansion due to the fact that uniform heating of the entire combustion area has never yet been achieved.

A further object of the invention is the provision of a valve seat insert ring on which a distorted valve may seal even though the metal of the block surrounding the annular recess in which the insert is received is itself temporarily distorted or is actually warped because of prior distortions. This object is obtained by anchoring the end of the insert ring proximate the base of the annular recess while providing a degree of flexibility for the end of the ring which has the seat. Although movement of the flexible end does make an elliptical seat for example to mate perfectly with the dished or otherwise distorted valve, this deformation of the seat neither injuriously affects the operation of the valve nor its effective life. Exactly the opposite occurs because the correct seal precludes leakage of the high pressure, high temperature gases which would cause overheating, burning, and warpage of the valve structure if allowed to seep.

A further object of the invention is to provide a one-piece valve seat free from reentrant angles and solidly anchored to the block away from the valve seat and having a degree of freedom all the way around the seat end of the ring so the seat may deform with the block and also may deform with the valve and will avoid leakage even with long subjection to extreme overload conditions with exhausts running quite black.

As is well known, we cannot secure uniform heating, when the engine is hot, all over the combustion chamber area including the valves and their seats. Unequal heating therefore distorts all parts due to the uneven expansion and we must take steps to eliminate leakage of hot gases under high pressure at this will over-heat, burn and warp the valves. With the present invention while the seat is deformed on its seating end to accommodate the valve head on the inside diameter of the seat, it fits the casting perfectly on the outside diameter of the seat.

Figure 1:
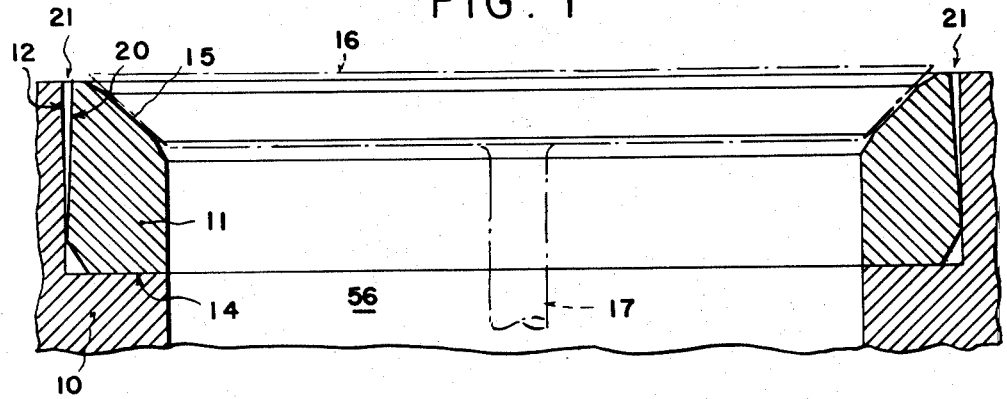
Figure 1 is a vertical section.

In Figure 1 the invention is shown in its preferred form. The casting 10 has a recess for the reception of a valve seat insert 11, such recess having a cylindrical side wall 12 and a plane bottom surface 14. The valve insert 11 has a valve seat 15 which is engaged by the valve head 16, the stem of the valve head being denoted 17. The conical wall 20 of the annular insert 11 is tapered so an annular recess 21 is formed between the wall 12 of the recess and the outer wall 20 of the insert. The preferred angle of taper is ¾ of a degree so that the radial width of the mouth of the opening 21 would be 3 or 4 thousandths of an inch for an over-all diameter of the insert of 1¾".

Figure 2:
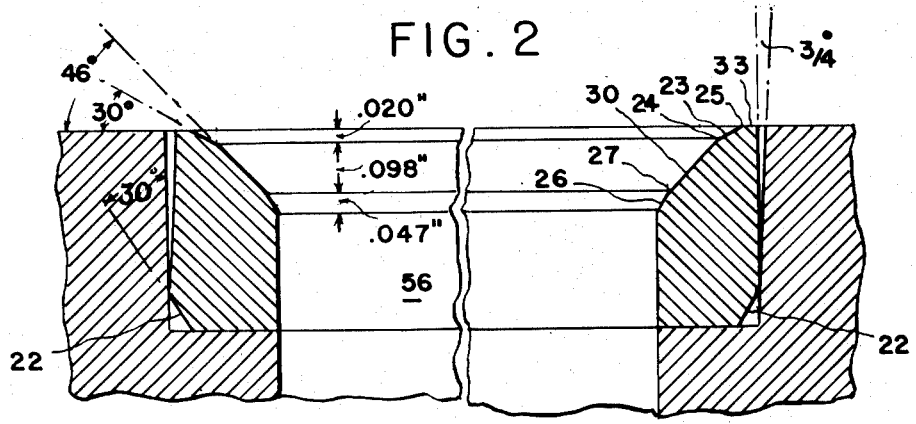
Figure 2 is a radial section.

Referring particularly to Figure 2, the lower annular face 22 is angled at 30° as is common and the faces 23 between the points 24 and 25 and the face 26 are merely to provide relief to prevent the valve from embedding itself into the seat and to limit the width of the valve seat 30 between the points 24 and 27 to the preferred dimension which in the case of 1¾" diameter insert would be .098" measured axially of the insert. The corresponding axial dimension of the two 30° relief faces are .020" outside and .047" inside, bearing in mind that these two figures are not of importance and may vary considerably to insure that the conical band 30 may be held to minimum tolerance.

The seat 30 is at an angle of 46° with respect to the outermost and plane face 33. This particular angle is used as it tends to minimize valve head distortion in high output engines. With the high pressure normally used the valve head probably dishes slightly under compression pressure so as to tend to leave an opening around the periphery which would permit accumulation of dirt with a subsequent destruction of both the valve and the seat. The 46° angle is important because in addition to the foregoing, the seating surface is maintained when the valve deforms the seat, the seat angle changing in one diameter of the circumference to perhaps 45° whereas at right angles to that diameter, the seat angle may become 47°. In either event contact is maintained on the outer part of the seat and this prevents the carbon ash or other dirt from wedging itself as previously mentioned, also preventing overheating of the valve.

The material of the insert is an alloy which does not lose its temper at any operating temperature and is of such hardness that it should be ground after the roughly formed seat is anchored in place in the recess in the cylinder head casting because of the great difficulty in tooling this hard metal to the precision desired. The valve guides (not shown) are installed in the head at the same time as the inserts and the usual arbor is fitted in normal manner to the valve guide and carries on a rotating bushing three conical grinding wheels (not shown) having respectively included angles of 120°, 60° and 88°. This insures that the .098" dimension is maintained all around the seat, that is, the seat width is quite uniform although the dimensions on each side, .047" and .020" may vary due to the impossibility of erecting the stationary arbor in the precise center of the passage in the head.

Figure 3:
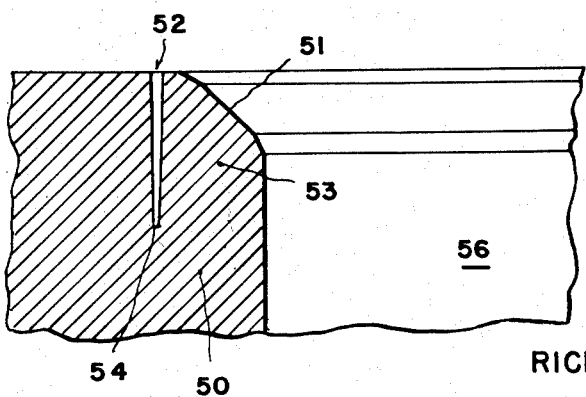
Figure 3 is a modification.

In Figure 3 the basic idea is shown, 50 being a block with a valve seat 51, corresponding to valve seat 15 in the preferred form, which is surrounded by an annular groove 52 to permit the metal in area 53 to yield in the same manner as the ring 11 may yield. The groove 52 should be of the depth of the groove 21 in the preferred form or even deeper and would necessarily have a bottom of appreciable width as at 54. Its radial width at the top might be twelve thousandths or less and the outside diameter of the recess, in this or in the preferred form, is about 1¼ times the diameter of the passage 56 in the engine block 10 or 50.

What I claim is:

1. A valve seat insert suitable for use in an internal combustion engine block having a cylindrical recess for receiving it: comprising a tapered ring of metal having a hardness appreciably greater than that of the metal of the block, snugly fitting said recess near the base of the recess and loosely fitting the recess at the top thereof, said ring having a valve receiving seat and having a diameter at the seat end at least five thousandths of an inch less than the diameter at the end engaging the base of the recess in the engine block.

2. The insert of claim 1 in which the angle of taper is approximately ¾°.

3. The insert of claim 1 in which the outer diameter of the ring near the base of the recess is between five and twelve thousandths of an inch greater than the outer diameter of the ring nearest the surface of the block.

4. The insert of claim 3 in which the difference between the said outer diameters is approximately ½% of the smaller outer diameter of the insert and the radial width of the annular gap between the recess and the insert is therefore about ½% of the smaller outer radius of the insert.

5. A cylinder block having therein a cylindrical passage having a valve seat at its free end, said block having an annular recess coaxial with the valve seat, said recess being at least ¼" deep, less than one hundredth of an inch in radial width at its open end and tapering down to less than five thousandths of an inch proximate its bottom, the greatest diameter of the recess being less than 1½ times the diameter of the cylindrical passage.

6. The block of claim 5 in which the greater diameter of the recess is approximately 1¼ times the diameter of the passage.

7. The combination with an engine block having a passageway therein to be closed by a valve and having an insert receiving recess coaxial with the passageway, of a valve seat insert firmly anchored at the base of the recess and loosely fitting the recess at the valve seat end to form with the surface of the recess an annular gap of not less than two and one-half thousandths of an inch measured radially at the top, said gap narrowing down toward the solidly anchored bottom end, said insert being of a material having a hardness greater than that of the body of the block, and which will not lose its temper at any normal operating temperature, whereby a distorted valve by reason of the flexibility of the end of the insert having the valve seat, may seat snugly to form a seal on the insert even though the metal of the block is itself distorted.

8. The combination of claim 7 in which the radial cross section of the valve seat makes an angle of 46° with the outer surface of the engine block, and said seat is relieved on both sides thus leaving a central conical zone for engagement with the valve head.

RICHARD H. SHEPPARD.

No references cited.